(No Model.) 2 Sheets—Sheet 1.
L. D. RICHARDSON, J. R. TRIMMER & E. E. LOOMIS.
WEIGHING AND TRANSFER CAR.
No. 264,762. Patented Sept. 19, 1882.
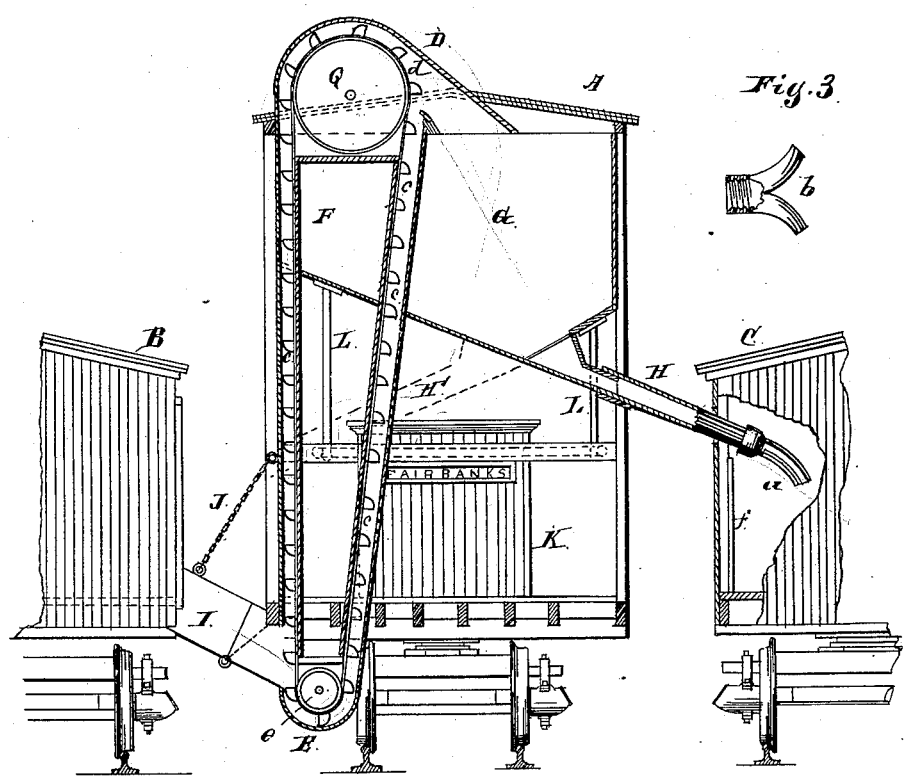

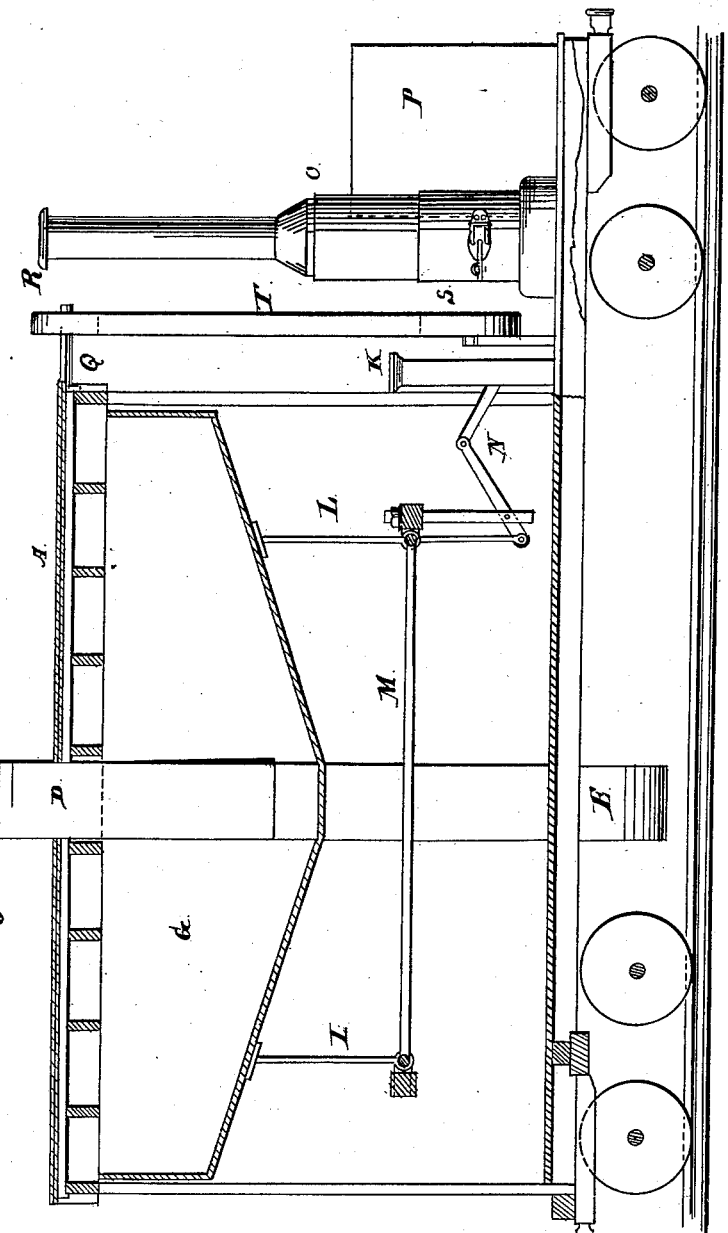

UNITED STATES PATENT OFFICE.

LLOYD D. RICHARDSON, JOHN R. TRIMMER, AND EUGENE E. LOOMIS, OF CHICAGO, ILLINOIS.

WEIGHING AND TRANSFER CAR.

SPECIFICATION forming part of Letters Patent No. 264,762, dated September 19, 1882.

Application filed May 11, 1882. (No model.)

*To all whom it may concern:*

Be it known that we, LLOYD D. RICHARDSON, JOHN R. TRIMMER, and EUGENE E. LOOMIS, residing at Chicago, in the county of Cook and State of Illinois, and citizens of the United States, have invented a new and useful Improvement in Weighing and Transfer Cars, of which the following is a full description, reference being had to the accompanying drawings, in which—

Figure 1 is a cross-section of the weighing transfer-car, showing its connection with a delivery and a receiving grain-car, the receiving-car being partly broken away. Fig. 2 is a longitudinal vertical section of the body of the weighing transfer-car with a vertical generator mounted upon one end or an extension; Fig. 3, a detail showing a forked end for a delivery-spout.

The object of this invention is to provide, by means of suitable appliances, a system for weighing and transferring grain, or weighing or transferring from one car to another on the tracks of the road, so as to avoid the necessity of running cars to elevators, or to any special place or position for transferring the grain from one car to another, or for transferring without weighing, or for taking the grain, weighing it, and returning it to the same car.

By the system now and heretofore in use, in order to transfer grain, each car has to be taken to the track-scale, weighed, and then the grain is delivered into another car by hand, and the car then reweighed, which is not only a tedious and expensive operation, but it is also so inaccurate as to be entirely unsatisfactory in its results, variations amounting to the weight of four or five bushels of grain frequently occurring from various causes, such as the wetting of the car between the first and second weighings, the wetting or changing of the track-scale, &c. By our improvements these difficulties are avoided, and an easy, cheap, and efficient system of transferring and weighing grain is provided, which is accurate and satisfactory in its results, as the scale does not get wet, and the wetting of the cars has no effect upon the weighing of the grain.

The nature of our invention consists in providing an improved car for weighing and transferring grain from one car to another, or weighing and returning it to the same car; in combining a movable bin with an elevator and a scale within a traveling-car, and in the several improvements and combinations of parts hereinafter more fully described and claimed as new.

In the drawings, A indicates a weighing transfer-car; B, a portion of a car from which grain is being discharged; C, a portion of a car into which the grain is delivered; D, the elevator-housing; E, a concave grain-receiver; F, the elevator-belt; G, the bin or grain-receptacle within the car A; H, delivery-spout; I, receiving spout or chute; J, chain or cord for holding the spout I; K, an ordinary scale-box for a platform-scale; L, posts or bars for supporting the bin G on the scale-platform; M, scale-platform; N, levers connecting the platform with the scale-box; O, an upright steam-generator; P, tank and fuel-box; Q, shaft for operating the elevator; R, pulley or driving-wheel on the shaft Q; S, wheel driven by an engine connected with the steam-generator; T, driving-belt; *a*, curved rotating end for delivery-spout; *b*, branched or forked end for delivery-spout; *c*, cups or buckets on elevator-belt F; *d*, driving-wheel on shaft Q for operating the elevator-belt; *e*, pulley or idler for the lower end of the elevator-belt.

The cars B C, which are partly shown, are ordinary grain-cars of the usual construction.

The car A, while made mainly in the form of an ordinary grain-car, is made considerably larger, the best proportions being of a height of ridge nineteen feet above the track, an exterior width of ten and one-half feet, a length of thirty-five feet, the box part being about twenty-three feet, while the balance of the platform is occupied by the stationary engine, its machinery, water-carrier, and fuel-box or tender, the dimensions in height and cross-section being about the same as those of an ordinary sleeping-car, which size permits the car to run anywhere, as provision is always made in track-yards for cars as large as sleepers.

The bin G is located in the top of the car, as shown, and is of a capacity of one thousand bushels or for the entire load of an ordinary grain-car. It is strongly constructed in order to bear and support the weight without spreading or pressing against the car, and it is supported upon a scale-platform, M, by the posts or metallic bars L, of which a sufficient number are used to give the bin a firm support upon the scale. We use the ordinary Fairbanks or other standard scale, and as we have not improved the construction of the scale itself a description of it will not be necessary. It is, however, connected with the scale-box by the levers N, and the scale-box K is so located that it can be manipulated and observed by the engineer or a special weigher without entering the car. As shown, it is outside of the box or inclosed part of the car; but to avoid the effect of storms it may be located just inside; or it may have a special covering to protect it and the attendants. A sufficient opening is made in the side of the bin for the passage of the elevator housing or boxing to be free and clear therefrom.

The elevator-casing D E is adapted to fit the car, the upper end projecting above the roof, so as to give the elevator-belt a sufficient turn to discharge the grain when the bin is at its highest point, while the lower end projects below the car down as near the track as it can be located with safety, so that the grain which is being discharged into it will have a sufficient incline or descent to enter easily and rapidly.

The belt F, the wheels $d$ $e$, and the buckets $c$ are of the ordinary construction and operation.

The spout or chute I has its lower end firmly attached to the car and bottom E of the elevator, and, as shown, its outer end is hinged, so as to adapt it to cars of varying heights, and also to permit of its being folded upward against the car A, so as not to come in contact with cars when being moved or with moving cars. It is operated and may be partly supported by a chain, J. The car, however, from which the grain is being discharged will furnish a sufficient support, and it may be otherwise folded; or the outer section may be made sufficiently smaller to slide into and out of the inner and lower section, as desired.

The delivery-spout H passes into the receiving-car near its top, owing to the elevation of the bin G of the transfer-car, and, as shown, passes near the top of the opening for the main door and over the grain-door $f$. This spout may be hinged so as to drop down against the side of the car A when not in use; or it may be made telescopic—that is, in sections sliding one into another. Its delivery end, as shown, is provided with a curved rotative delivery-spout, so that by placing an attendant in the car to rotate it the grain may be spouted to any point along the length of the car. When it is desired to dispense with an attendant for directing the flow of the grain or trimming the car the forked spout end $b$, Fig. 3, is applied to the spout H, which throws the grain to the ends of the car, and the motions of the car in running will level and trim the grain without an attendant. The spout H, with its discharging ends, as shown, are circular or cylindrical in cross-section; but they may be made square or angular whenever the discharge-spout $b$ or other non-rotative spout only is used.

It frequently occurs that the owners of grain do not desire to have it changed between the shipping and destination points, while it is desirable to take the weight of the grain at one or more intermediate points. In order to accomplish this and prevent a mixing or changing of special grains, we discharge the grain from the car into the bin and weigh it in the usual manner; but the spout H is taken to the opposite side of the car from where it is shown and attached to an opposite connection, (shown in dotted lines at H',) so that when the grain is discharged it is returned to the same car from which it was taken, and it is accurately weighed without being permanently removed from the car in which it was shipped, and the receiver has the assurance of obtaining the identical grain originally shipped. The weighing transfer-car is provided at one end with a suitable engine (one having a vertical boiler being indicated) for operating the elevator and the car. Suitable connections are made between the engine and the wheel S to drive the shaft Q. This shaft Q is supported in boxes above the roof or by hangers below, as may be desired. If above, the shaft should be protected by a suitable casing or housing. We also propose to connect the engine by means of sprocket-wheels and chains with one pair of the supporting-wheels, so that the transfer-car may be moved along the track by the same power which operates the elevator, which will be sufficient for use in the yard or where the transfers are made. For any considerable travel an ordinary locomotive may be attached to it as to any other car. The details for driving the wheel S or for moving the car along the track are not shown or fully described, as they may be of any of the common forms of constructions usual for such purposes.

Housings may be placed on the roof or under the eaves for carrying canvas or oil-cloth to be spread over the cars B C or either of them, so that the operation of transferring may not be hindered or delayed by rain or storms.

The operation of the devices will be obvious from their construction and the descriptions.

By this system or method of transferring grain we have a traveling elevator-car which can be moved from one position to another, so as to take parallel trains of cars without delay and without the difficulty of moving the cars containing the grain from one position to another, or from a track-scale to some convenient point for unloading, and without running them to or into an organized elevator-building; and it will be evident that the grain may be taken from one car into the bin G and weighed, and then the car A may be moved to discharge it into a receiving-car some distance away from the car out of which the grain was taken, so that whether the cars B C are in line or not the grain may be readily received from one, weighed, and transferred to another cheaply and expeditiously, and without loss of or injury to the grain, and, by reason of the elevated position of the bin G, an entire cargo of grain is made to flow into the receiving-car without shoveling or other manual labor.

As there is sufficient unoccupied room beneath the bin, a shaft may be located therein with the necessary connections for operating a steam shovel or scoop for discharging the grain from the delivery-car into the spout I, which should be nearly or quite as wide at its outer end as the door-space of the delivery-car, while its lower end may be narrowed to fit a narrower receiver E; or the receiver and elevator may be of the width of an ordinary grain-car door. By this arrangement we are enabled to use a fixed receiver and to avoid the use of hinged or swinging elevator-tubes, together with all vertical adjustments thereof, and also the use of apparatus exterior to the car body or box, except the spouts, which gives greater stability and avoids a great liability to breakage and thereby makes a saving in repairs. By making the bin large the car body or box gives it lateral support, so that the car can be moved with the bin full, and we avoid the repeated weighings necessary in the use of hoppers and chutes, save much time, and arrive at more satisfactory and accurate results, and by locating the scale-beam, either with or without a special box, K, outside the body or box of the car the operator or tally-clerk and the other attendants are free from the dirt and dust produced by the elevation of the grain.

What we claim as new, and desire to secure by Letters Patent, is—

1. The combination, within the car A, of the fixed elevator D F, receiver E, grain-bin G, and a weighing-scale, substantially as and for the purpose specified.

2. The combination of the receiving-spout I with the receiver E, elevator D F, and an elevated receiving-bin, G.

3. The combination of the receiving-spout I, fixed receiver E, and elevator D F with the bin G and delivery-spout H, substantially as described.

4. The combination, in the box or body of the car A, of the bin G, supported on the weighing or scale platform M, with the levers N and the scale beam or box located outside of the car box or body, substantially as and for the purpose set forth.

5. As an improved weighing and transferring car, the car A, having within it the fixed receiver E, stationary elevator D F, and bin G, supported on the platform M, combined with the receiving-spout I and discharge or delivery spout H, constructed and operating substantially as specified.

6. The described method or system of transferring grain on railway-tracks by interposing between cars standing thereon an elevating and weighing car mounted on traveling wheels and arrayed for receiving the grain by gravity from a delivery-car in a receiver lower than its platform, elevating the grain into a weighing-bin arranged sufficiently above a receiving-car to have the cargo discharged therefrom by gravity, whereby weighing elevation only is required, and the use of track-scales and elevator-buildings avoided, substantially as specified.

LLOYD D. RICHARDSON.
JOHN R. TRIMMER.
EUGENE E. LOOMIS.

Witnesses:
L. L. BOND,
ALBERT H. ADAMS.